United States Patent [19]
Cheng

[11] Patent Number: 6,048,037
[45] Date of Patent: Apr. 11, 2000

[54] DETACHABLE DEVICE OF A STROLLER WHEEL

[75] Inventor: Ying-Hsiung Cheng, Tainan Hsien, Taiwan

[73] Assignee: Top Fortune Ltd., San Diego, Calif.

[21] Appl. No.: 09/212,307

[22] Filed: Dec. 16, 1998

[51] Int. Cl.[7] .................................................. B60B 23/00
[52] U.S. Cl. ........................ 301/111; 280/655; 280/47.17
[58] Field of Search .................................. 301/111, 125, 301/137; 280/47.131, 47.14, 47.24, 47.315, 647–654, 639, 47.17, 638, 655, 655.1

[56] References Cited

U.S. PATENT DOCUMENTS

| | | | |
|---|---|---|---|
| 2,704,165 | 3/1955 | Hoover | 301/47.24 |
| 5,096,265 | 3/1992 | Chang | 301/111 |
| 5,180,179 | 1/1993 | Salvucci | 280/47.26 |
| 5,526,894 | 6/1996 | Wang | 280/646 |
| 5,529,385 | 6/1996 | Tsao | 301/111 |
| 5,658,054 | 8/1997 | Wu | 301/111 |
| 5,704,629 | 1/1998 | Wu | 280/646 |
| 5,769,447 | 6/1998 | Huang | 280/642 |
| 5,772,223 | 6/1998 | Letourneau | 280/47.131 |
| 5,857,684 | 1/1999 | Liao et al. | 280/645 |
| 5,879,013 | 3/1999 | Shih | 280/11.28 |

*Primary Examiner*—S. Joseph Morano
*Assistant Examiner*—Long Bae Nguyen
*Attorney, Agent, or Firm*—Rosenberg, Klein & Lee

[57] ABSTRACT

A detachable device of a stroller wheel includes a connecting member, two wheels and a fixing member; the wheels are rotatably mounted on the connecting member, and the fixing member is pivoted on the connecting member. A connecting rod coupled to a lower end of a frame of the stroller is separately connected to the connecting member. The fixing member can be pivoted between a fixing position where a fixing hollow thereof firmly connects a protrusion on the lower end of the frame, and an unlocked position where the fixing hollow separates from the protrusion to allow the wheel to be removed from the frame.

2 Claims, 9 Drawing Sheets ically include frames, seat and wheels as main parts. The wheels are rotatably mounted on lower ends of the frames for providing the stroller with mobility. The seat is supported by the frames for a baby to be seated therein. Furthermore, collapsible stroller is devised, which can be folded to a compact one for easy storage and transportation.

DETACHABLE DEVICE OF A STROLLER WHEEL

BACKGROUND OF THE INVENTION

Strollers are used for transporting babies and basically include frames, seat and wheels as main parts. The wheels are rotatably mounted on lower ends of the frames for providing the stroller with mobility. The seat is supported by the frames for a baby to be seated therein. Furthermore, collapsible stroller is devised, which can be folded to a compact one for easy storage and transportation.

Referring to FIGS. 8 and 9, a heretofore known stroller has a connecting member 30 fitted to a lower end of a supporting frame 10 thereof. A locating member 40 is connected to the connecting member 30. A wheel 20 is rotatably connected to a connecting hole 405 of the locating member 40.

The connecting member 30 has a receiving hollow 301 fixedly folding the lower end of the supporting frame 10 therein, and a through hole 302, into which a connecting rod 303 is inserted. The connecting rod 303 has a head portion 304 at upper end thereof for engaging an upper end of the through hole 302. The connecting member 30 further has a guide rail 305, which has a substantially T-shaped cross-section, for permitting a sliding member 306 to be slidably connected therewith. The locating member 40 has a tube portion 401, into which a lower end portion of the connecting rod 303 is inserted, in order to connect both the connecting member 30 and the locating member 40; a fixing member (not numbered) is used to fixedly connect both the connecting rod 303 and the tube portion 401. The locating member 40 further has a guide rail 404 communicating with the guide rail 305 of the connecting member 30 such that the sliding member 306 can be moved into the guide rail 404 with upper end portion thereof still received in the guide rail 305. The tube portion 401 of the locating member 40 has an upper end portion 402 inserted into the through hole 302 of the connecting member 30, and an annular protrusion 403 engaging the lower end of the through hole 302.

In displaying or using the aforesaid stroller, the sliding member 306 is moved downward to be received in both the guide rails 305 and 404; thus, the locating member 40 cannot move relative to the connecting member 30, preventing the stroller from being unwarily moved sideways when a person accidentably pushes the stroller.

The above mentioned stroller has an advantage that it will not move sideways when being pushed because of the above said parts connected with the wheel. However, it has a disadvantage that the wheel is not detachable, and so takes extra room in packing and transportation. The manufacturer of the stroller has to use extra room in packing the stroller because of the wheel.

The number of strollers of above said nature that are held in one container is smaller than that of those having same size and detachable wheels. Consequently, the transportation cost is higher.

SUMMARY

The present invention relates to a wheel of a stroller, and more particularly to one having detachable feature.

It is an object of the present invention to provide a wheel of a stroller, which can be detached from the stroller when not in use for easy transportion and storage.

It is further object of the present invention to provide a wheel of a stroller, which can be mounted on, or removed from, the stroller very easily.

The detachable device of a stroller wheel of the present invention comprises a connecting member, two wheels, a fixing member; the connecting member has a round holes and two engaging members on two sides; the wheels are rotatably mounted on the connecting member; the fixing member has a finger press portion on top end, a fixing hollow, and two engaging members on two sides, and is pivoted to the connecting member.

A connecting rod fixed to lower end of a supporting rod of a frame of the stroller is separately inserted into the round hole of the connecting member; the lower end of the supporting rod is further combined with a housing member having engaging protrusions.

The fixing member can be pivoted between a fixing position and an unlocked position; when the fixing member is in the fixing position, the engaging members thereof engage the engaging members of the connecting members, and the fixing hollow firmly holds one of the engaging protrusions of the housing member such that the housing member is prevented from separating from the connecting member; when the fixing member is in the unlocked position, the engaging members of both the connecting member and the fixing member disengages, and the fixing hollow separates from the engaging protrusion to allow the connecting member associated with the wheels to be removed the housing member associated with the frame of the stroller.

BRIEF DESCRIPTION OF THE DRAWINGS

The present invention will be better understood by reference to the accompanying drawings, wherein.

DETAILED DESCRIPTION OF THE PREFERRED EMBODIMENTS

Figure 1:
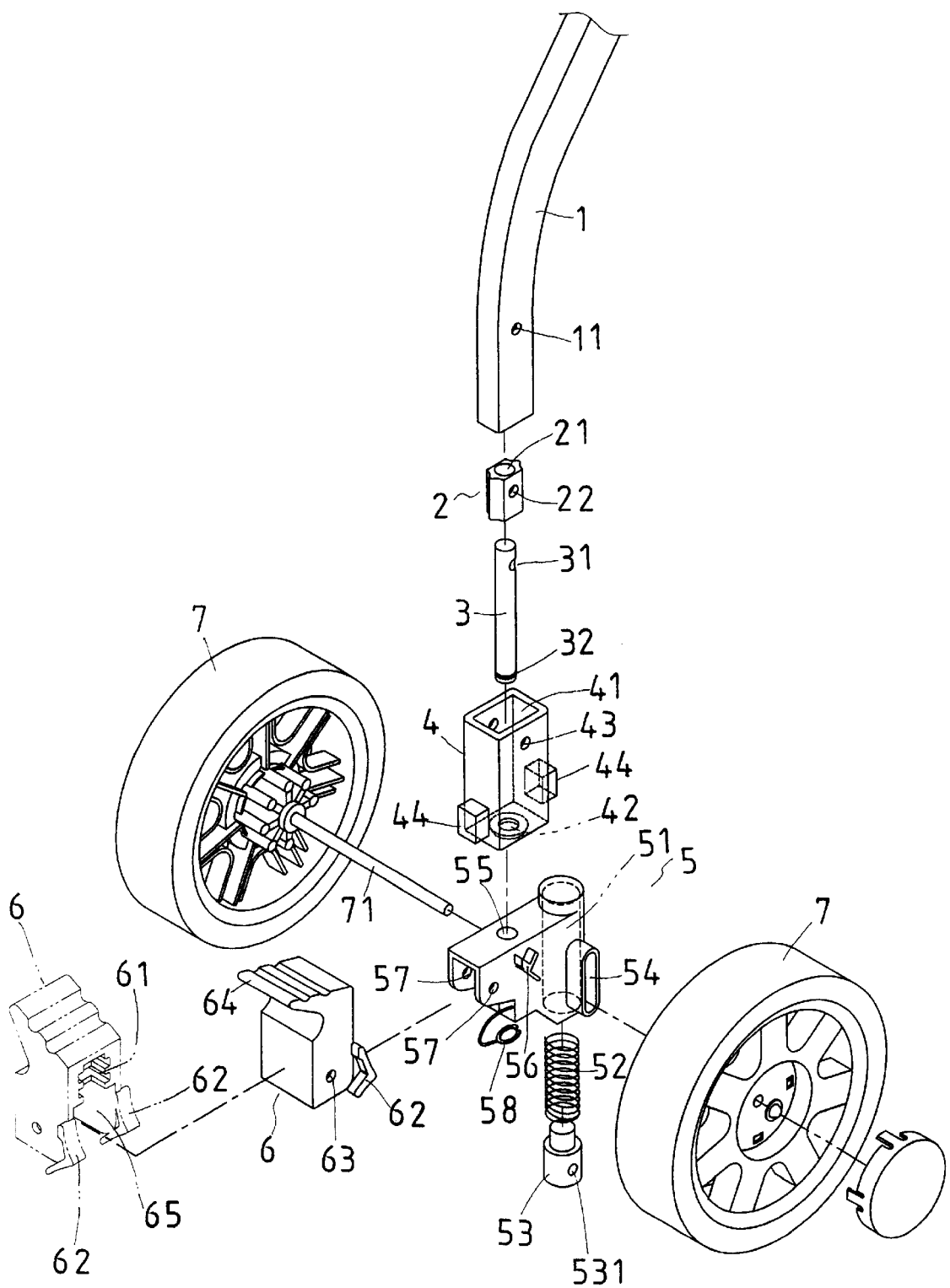
FIG. 1 is an exploded perspective view of a detachable device of a stroller wheel of the present invention.
Figure 2:
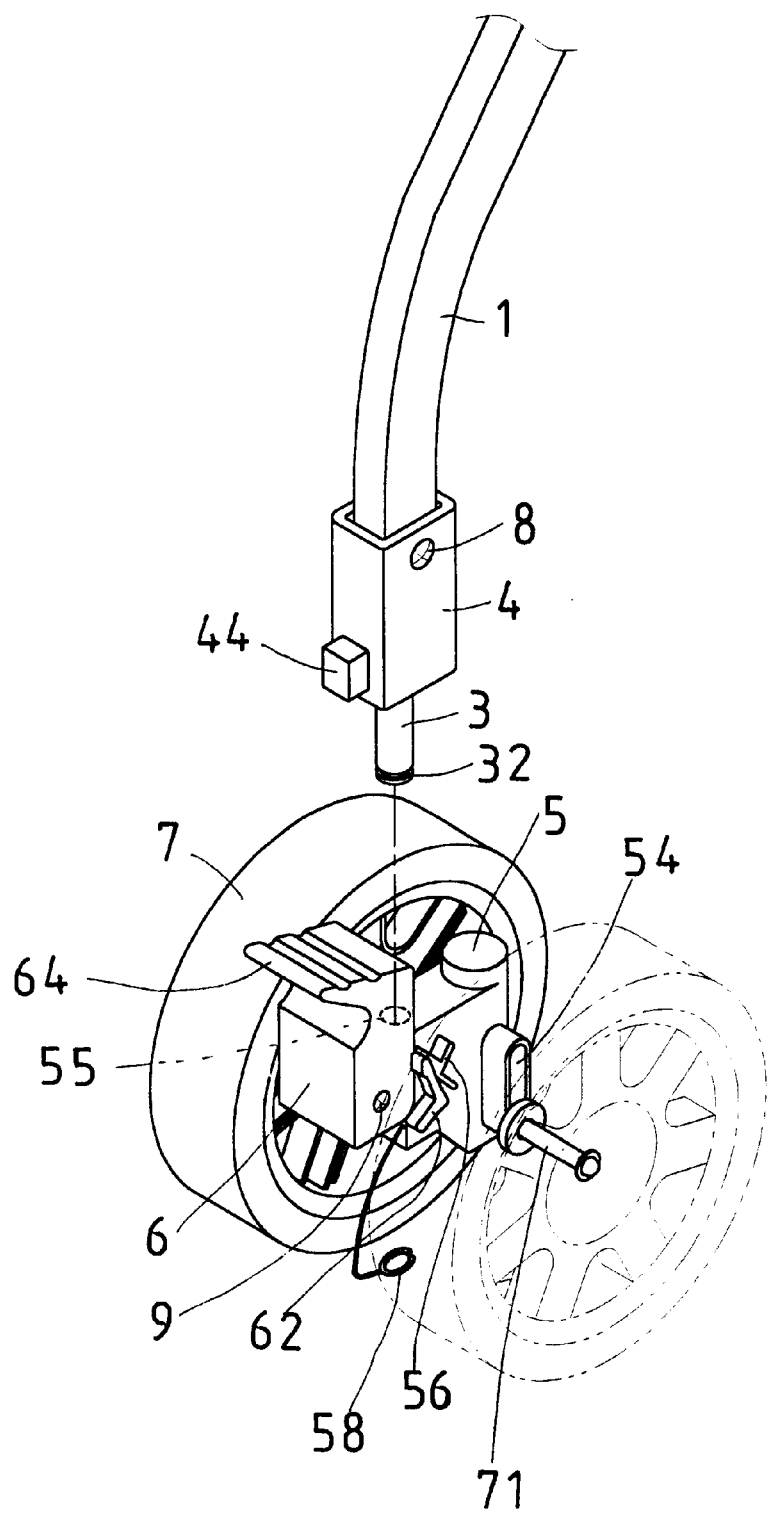
FIG. 2 is a perspective of the detachable device of a stroller wheel of the present invention.
Figure 3:
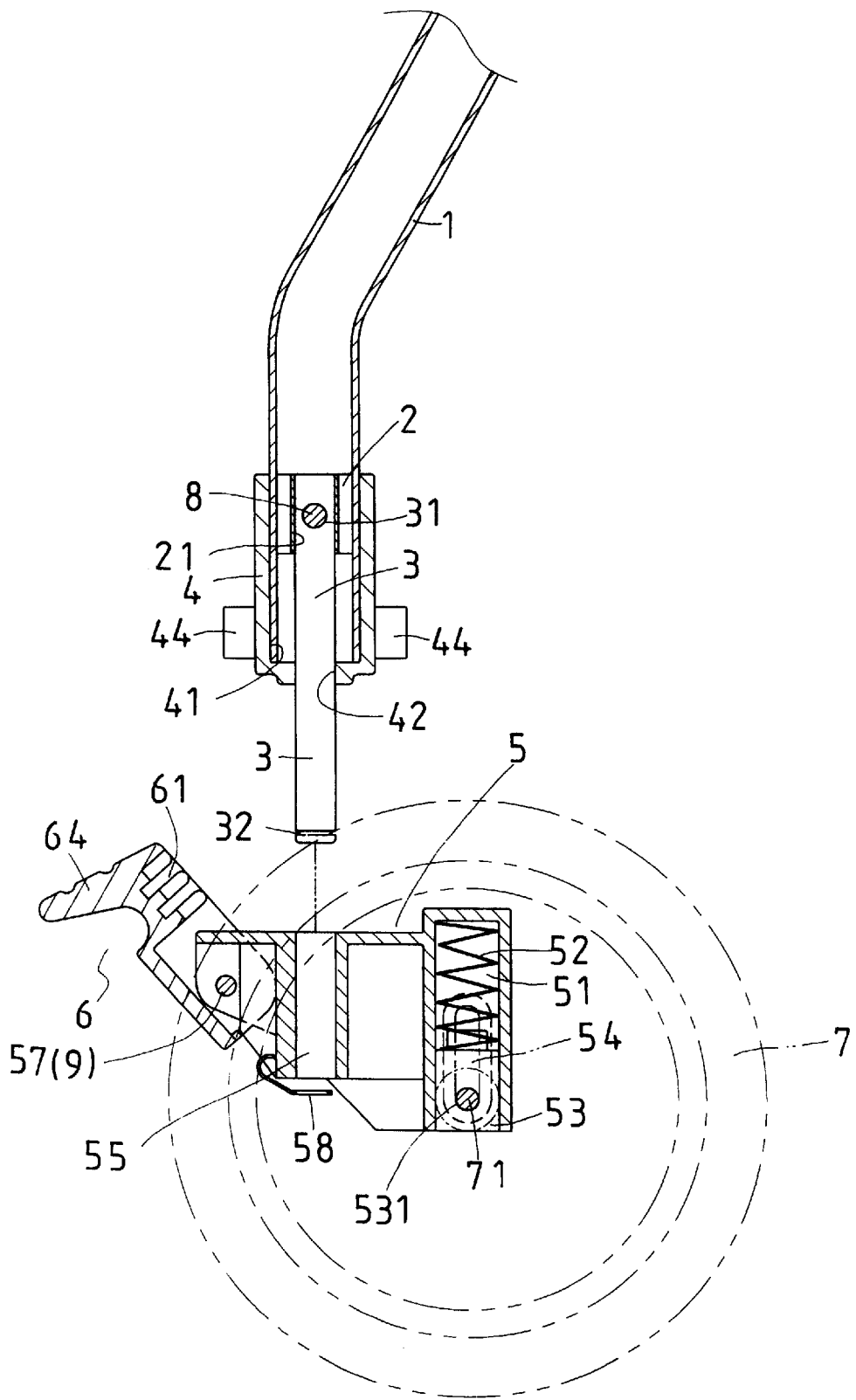
FIG. 3 is a cross-sectional view of the detachable device of a stroller wheel of the present invention.

A detachable device of a stroller wheel of the present invention, referring to FIG. 1, includes a locating block 2, a connecting rod 3, a housing member 4, a connecting member 5, a fixing member 6 and two wheels 7 as main parts.

The locating block 2 is retained inside a lower end of a supporting rod 1, which is one part of a frame of the stroller. The locating block 2 further has a holding hole 21 and a through hole 22.

The connecting rod 3 has a through hole 31 at an upper end portion thereof. The upper end portion of the connecting rod 3 is inserted into the holding hole 21 of the locating block 2; a fixing bolt (not shown) is inserted through the through holes 22 and 31 and the through hole 11 of the supporting rod 1, to fixedly connect the locating block 2, the connecting rod 3 and the supporting rod 1.

The housing member 4 has a hollow 41, two engaging protrusions 44, and a round hole 42. The lower end of the supporting rod 1 is fixedly retained inside the hollow 41 with the lower end portion of the connecting rod 3 inserted through the round hole 42 of the housing member 4; the fixing bolt is further inserted into locating holes 43 on two sides of the housing member 4 to connect the supporting rod 1 to the housing member 4; the hollow 41 is contoured to the shape of the lower end of the supporting rod 1 such that the supporting rod 1 cannot move relative to the housing member 4.

The connecting member 5 has a holding tube 51, an elongated hole 54 on two sides of the holding tube 51, a round hole 55, two engaging members 56 on two sides, two holes 57. An upper end of the holding tube 51 blocked up. A spring 52 and a connecting block 53 are movably housed with the holding tube 51; the spring 52 gives a downward biasing force to the connecting block 53.

The wheels 7 are connected to the connecting member 5 by inserting a spindle 71 thereof through the elongated holes 54 of the connecting member 5, and a connecting hole 531 of the connecting block 53.

Figure 5:
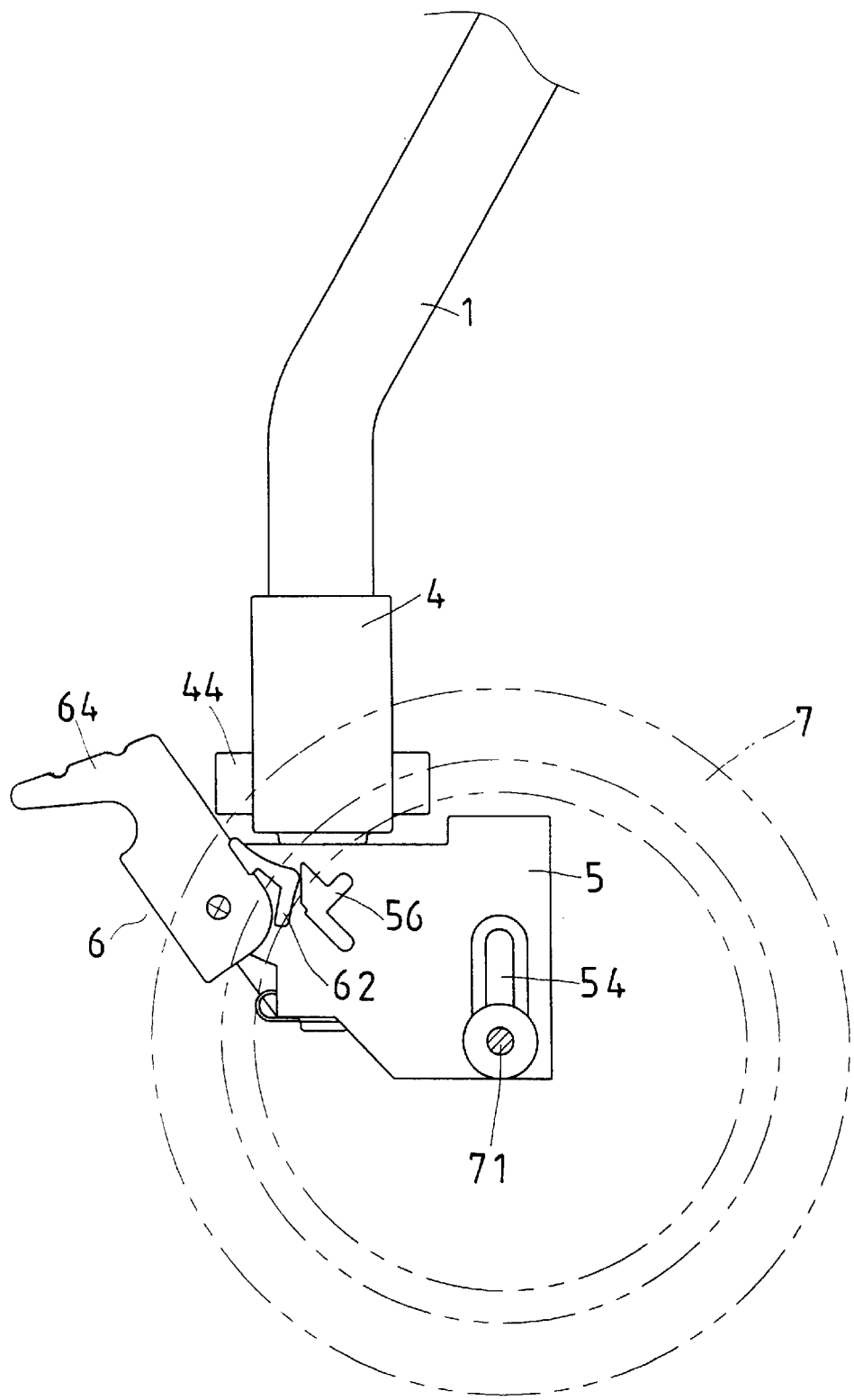
FIG. 5 is a side view of the detachable device of a stroller wheel of the present invention.

The fixing member 6 has a connecting hollow 65 in lower part thereof, two engaging members 62 on two sides, a fixing press portion 64 at upper end, a fixing hollow 61 above the connecting hollow 65 and through holes 63. The fixing member 6 is pivotally connected to the connecting member 5 by connecting the holes 57 and the through holes 63 with a pin (not shown). Thus, the fixing member 6 can be moved between a fixing position where the engaging members 62 thereof engages the engaging members 56 of the connecting member 5, as shown in FIG. 7, and an unlocked position where the fixing member 6 is pivoted away from the connecting member 5 to separate the engaging members 62 from the engaging members 56 as shown in FIG. 5.

The connecting rod 3 is passed into the round hole 55 of the connecting member 5, and is prevented from moving by fitting a C-shaped engaging member 58 on the annular recess 32 of the connecting rod 3. Thus, the supporting rod 1 of the frame of the stroller is connected to the connecting member 5, and is supported by wheels 7.

Figure 4:
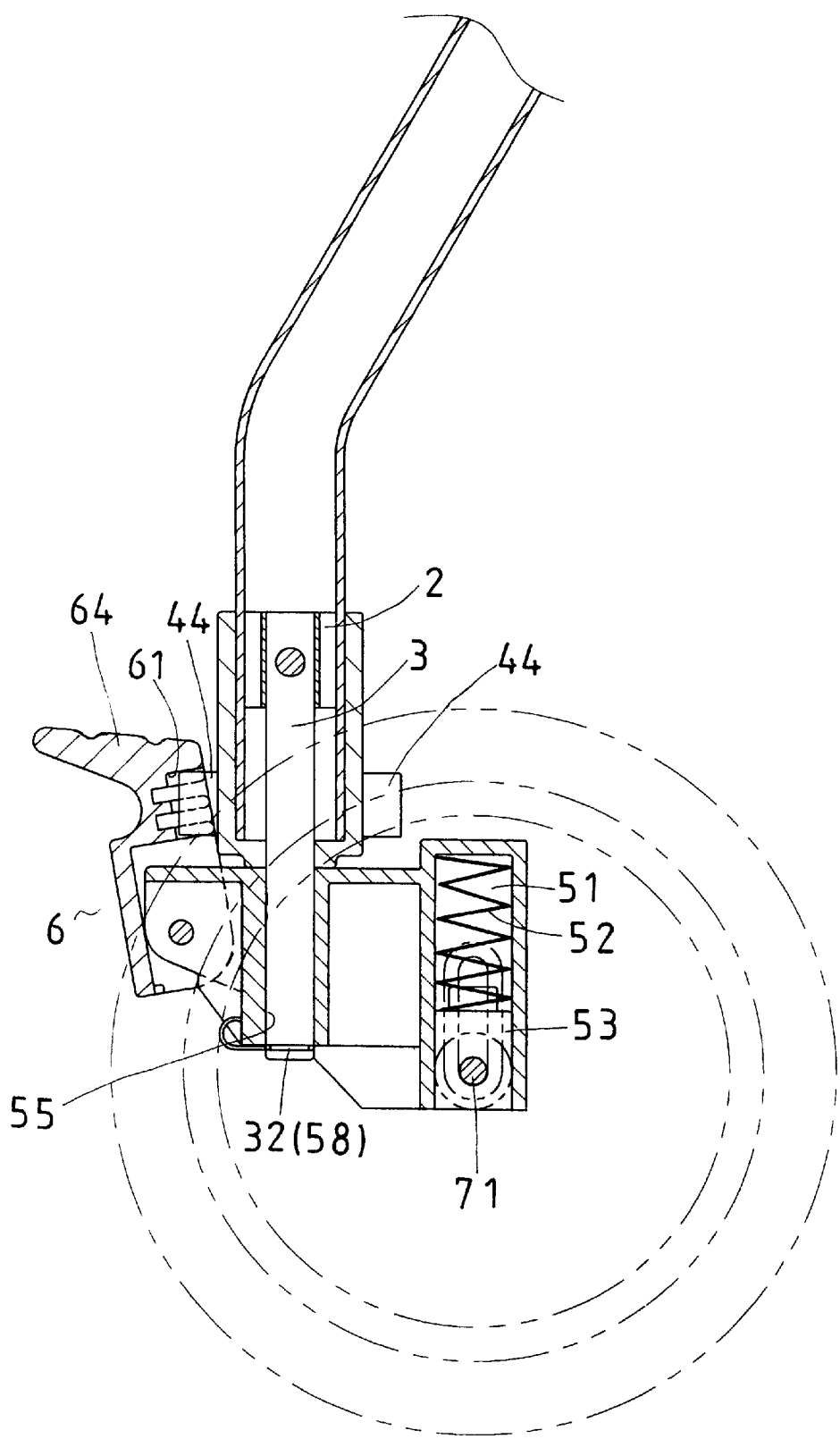
FIG. 4 is a cross-sectional view of the detachable device of a stroller wheel of the present invention.
Figure 6:
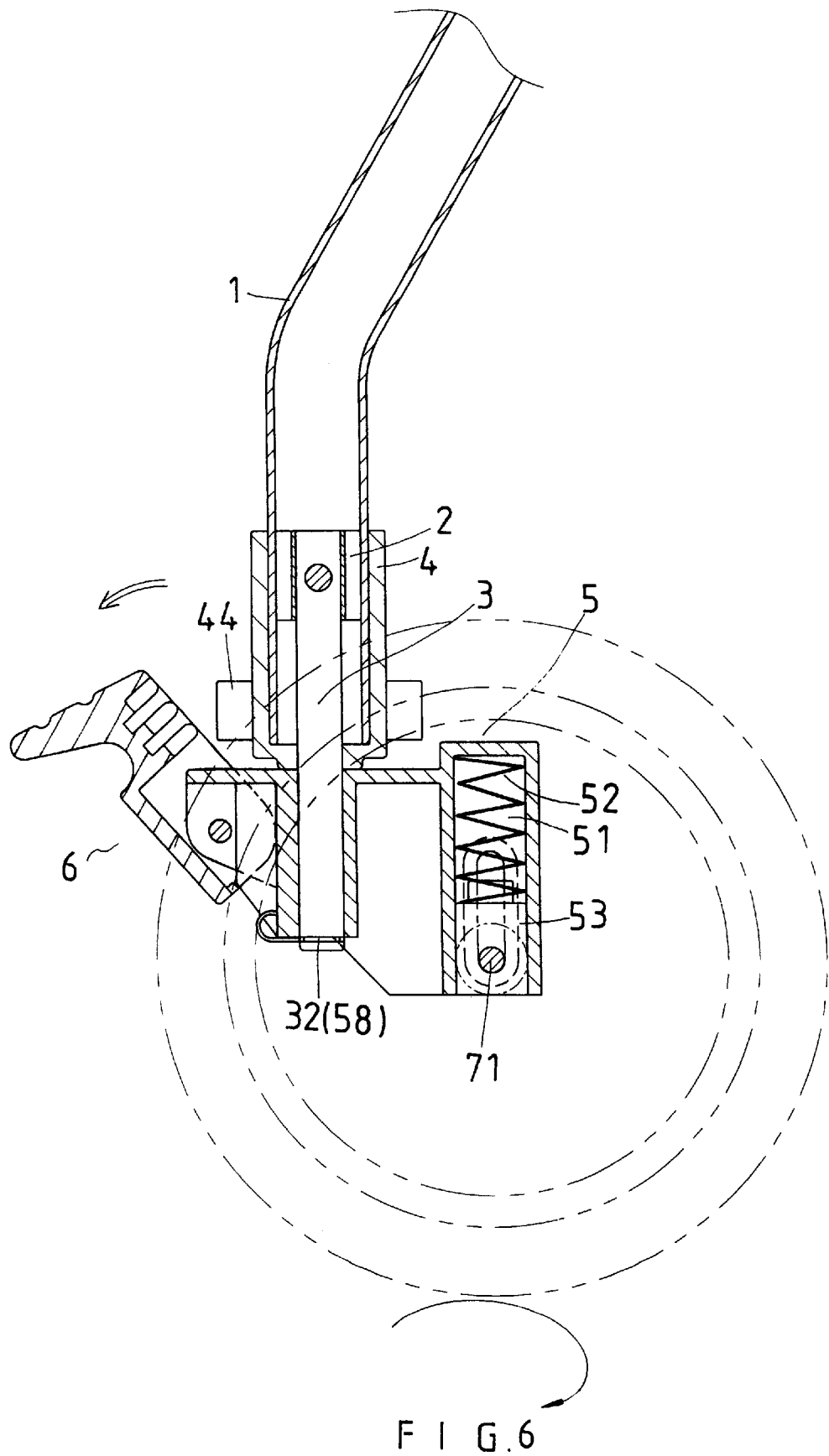
FIG. 6 is a view showing the movement of the fixing member in removing the wheel device of the present invention.

Referring to FIG. 4, when the fixing member 6 is pivoted to the fixing position, the fixing hollow 61 thereof engages one of the engaging protrusions 44 of the housing member 4 for preventing the housing member 4 from moving apart. Referring to FIG. 6, when the fixing member 6 is rivoted to the unlocked position, the fixing hollow 61 does not engage the engaging protrusions 44, and allows the housing member 4 to separate from the connecting member 5 upon removing the C-shaped engaging member 58 from the annular recess 32. Thus, the wheels 7 associated with the connecting member 5 and the fixing member 6 can be easily separated from the supporting rod 1 associated with the housing member 4.

Figure 7:
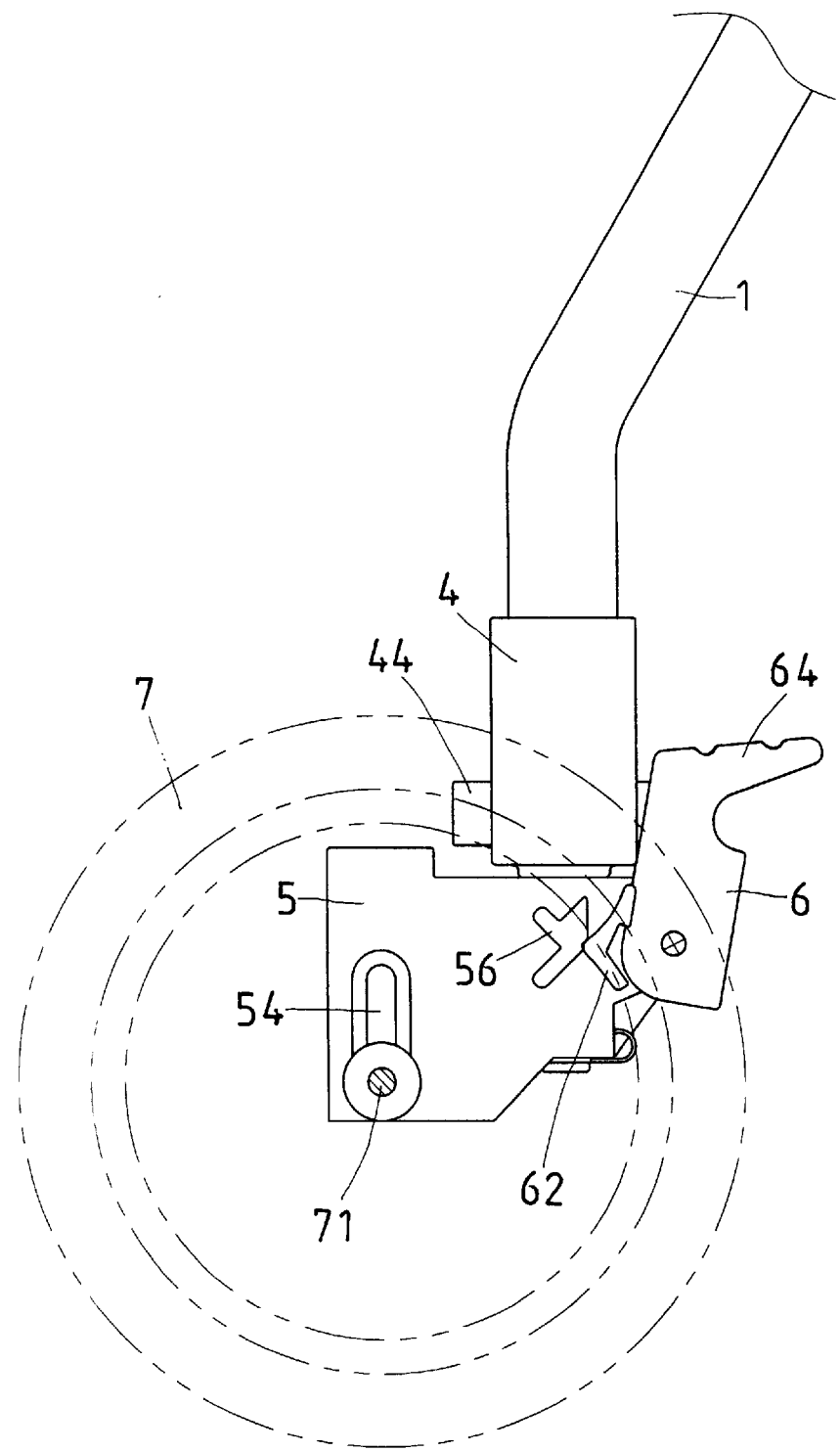
FIG. 7 is a view of the detachable device of a stroller wheel of the present invention, disposed in the other direction.
Figure 10:
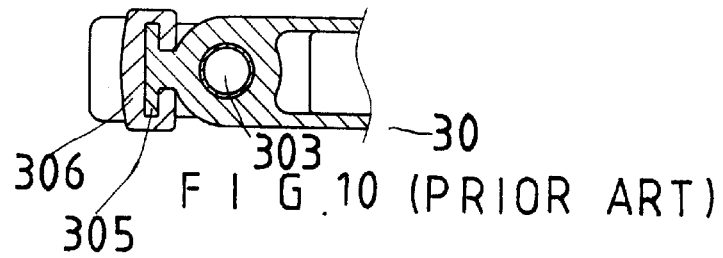
FIG. 10 is a top view of the prior art connecting member.
Figure 8:
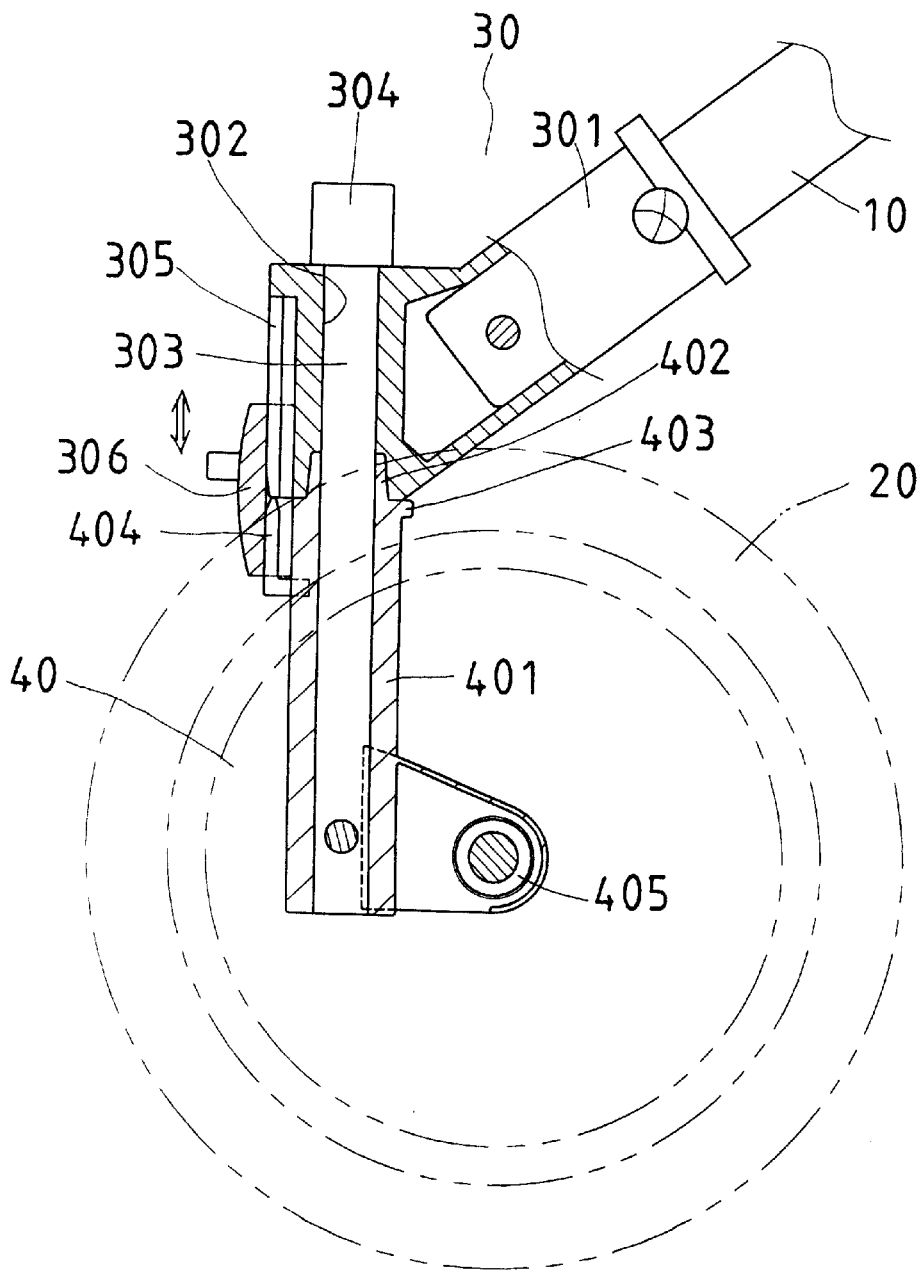
FIG. 8 is a cross-sectional view of a prior art wheel as described in the Background.
Figure 9:
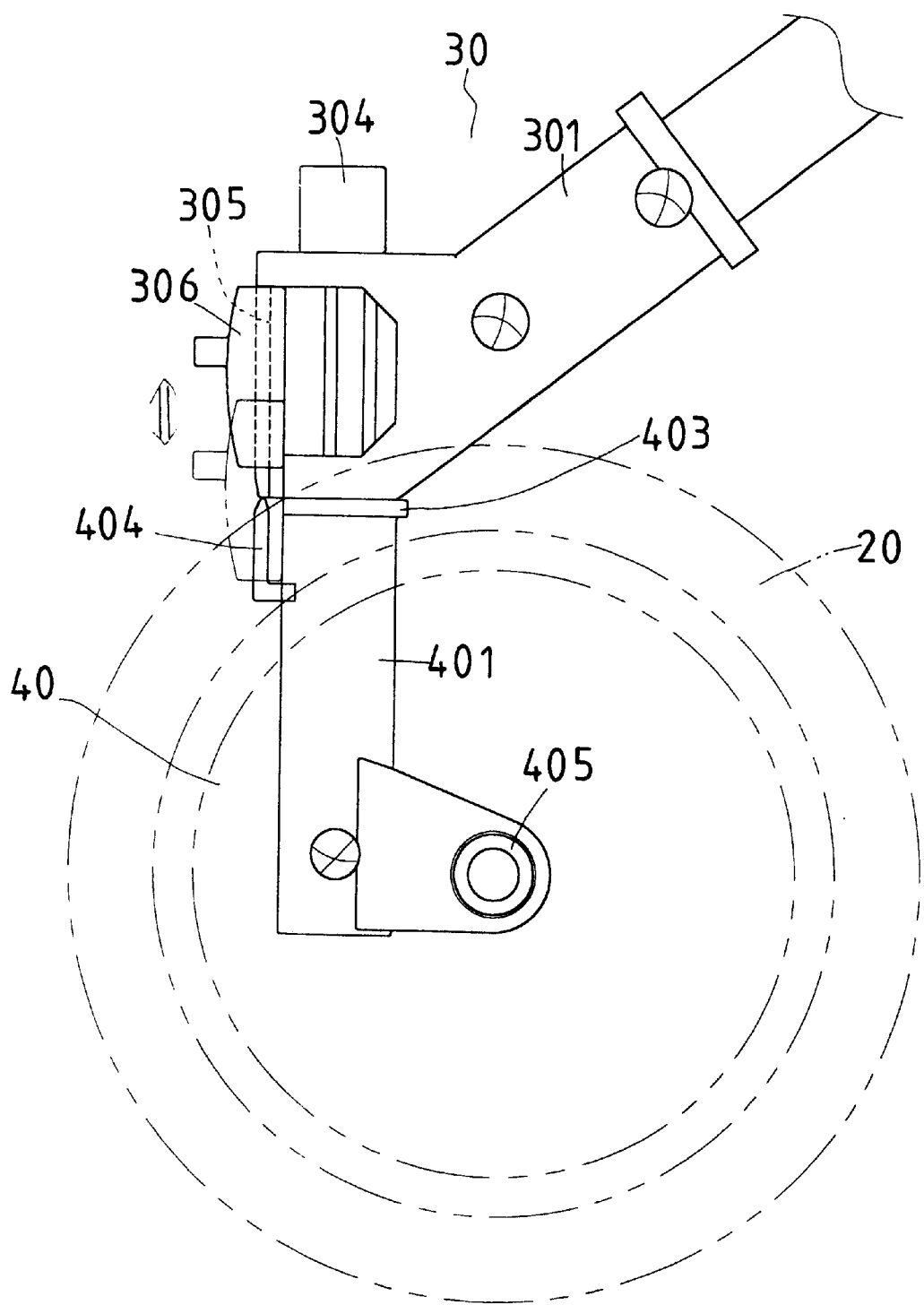
FIG. 9 is a side view of the prior art wheel.

Furthermore, because the engaging protrusions 44 are disposed at both the front and rear sides of the housing member 4, the wheels 7 can be connected to the supporting rod 1 from either one of the directions as shown in FIGS. 6 and 7; thus, a user can fit the wheels 7 to the supporting rod 1 in one of both direction according his/her demand.

From the above description, it can be understood that the detachable device of a stroller wheel of the present invention has following advantages.

1. The detachable device of the stroller of the present invention can be reoved from the stroller, and placed in spare room of the packing case to save space in packing and transportation. Consequently, the transportation cost is reduced.

2. The wheels can be connected to the supporting rod from two directions because of provision of the two engaging protrusions.

3. The fixing hollow, engaging protrusions, and engaging members of both the fixing member and the connecting member provide a relatively firm connection for the housing member 4, and both the connecting member and the fixing member, which the wheel is associated with.

What is claimed is:

1. A detachable device of a stroller wheel comprising:
   a connecting member having a round hole and two engaging members on two sides thereof;
   two wheels rotatably mounted on said connecting member;
   a fixing member having a finger press portion on top thereof, a fixing hollow in an upper portion thereof, and two engaging members on two sides thereof; said fixing member being pivoted to said connecting member;
   said round hole of said connecting member being separately holding a lower end portion of a connecting rod fixedly connected to a housing member and a supporting rod of said stroller;
   said connecting rod having an annular recess at lower end portion thereof;
   said housing member having tow engaging protrusions at a front side and a rear side respectively;
   said fixing member being capable of pivoting between a fixing position where said engaging members thereof engage said engaging members of said connecting member and an unlocked position where said engaging members thereof separate from said engaging members of said connecting members; said fixing hollow fixedly holding one of said engaging protrusions of said housing member to prevent said connecting member from moving apart from said housing member when said fixing member is pivoted to said fixing position; said fixing hollow being disengaged from said engaging protrusion and said connecting member associated with said wheels being capable of being removed from said housing member to separate said wheels from said housing member associated with said supporting rod when said fixing member is pivoted to said unlocked position.

2. A detachable device of a stroller wheel as claimed in claim 1 further having a C-shaped engaging member to be removably mounted on said annular recess of said connecting rod when said fixing member is in said fixing position.

* * * * *